April 23, 1968 M. J. HUBER Re. 26,383

HYDRAULIC TORQUE MOTORS

Original Filed Aug. 30, 1962

2 Sheets-Sheet 1

INVENTOR
MORTIMER J. HUBER
BY Robert M. Dunning
ATTORNEY

April 23, 1968

M. J. HUBER

Re. 26,383

HYDRAULIC TORQUE MOTORS

Original Filed Aug. 30, 1962

2 Sheets-Sheet 2

INVENTOR

MORTIMER J. HUBER

BY Robert M. Dunning

ATTORNEY

United States Patent Office

Re. 26,383
Reissued Apr. 23, 1968

26,383
HYDRAULIC TORQUE MOTORS

Mortimer J. Huber, St. Paul, Minn., assignor, by mesne assignments, to Gresen Manufacturing Company, a corporation of Wisconsin Original No. 3,215,043, dated Nov. 2, 1965, Ser. No. 220,355, Aug. 30, 1962. Application for reissue Oct. 31, 1966, Ser. No. 597,499
22 Claims. (Cl. 91—56)

Matter enclosed in heavy brackets [ ] appears in the original patent but forms no part of this reissue specification; matter printed in italics indicates the additions made by reissue.

*ABSTRACT OF THE DISCLOSURE*

*A fluid operated motor in which a gerotor fluid handling mechanism is operated with a first element stationarily disposed in a chamber of a housing and a second element is allowed to orbitally rotate about the first element. The rotational motion of the second element is transmitted to a shaft that is rotatably journaled in the housing coaxially of the first gerotor element so that the shaft rotates at a different speed of rotation than the second gerotor element.*

This invention relates to an improvement in hydraulic torque motors and deals particularly with a hydraulic motor capable of delivering a wide variety of speed ratios.

During recent years many types of hydraulic motors have been produced which are capable of transforming hydraulic pressure into a rotary movement. One such hydraulic motor includes a rotor housing incorporating a rotor chamber having rounded lobes projecting inwardly from the peripheral cylindrical wall of the chamber. An externally lobed rotor is rotatable within the housing, the rotor having one less lobe than does the peripheral housing and being so designed that the external lobes of the rotor continuously seal against the wall of the rotor chamber. The rotor is provided with one less lobe than the rotor chamber, and as a result as each lobe of the rotor enters the subsequent space between the lobes on the housing, the axis of the rotor travels along an orbital path.

With such an arrangement, the force exerted against the rotor must be transmitted from the wobble shaft on which the rotor is mounted to a driven shaft. The speed reduction is limited to the number of lobes in the housing, and when the housing is provided with six internal lobes, the reduction will be limited to a six-to-one ratio. It is an object of the present invention to provide an improved structure in which the ratio may be greatly increased, and to obviate other difficulties which are experienced with the previous forms of hydraulic motors of this general type.

A feature of the present invention resides in the provision of a fluid motor including an internally lobed housing and an externally lobed member within the housing which is in continuous sealing contact with the lobes of the housing and which has one less lobe than the housing, so that a fluid may be employed to cause relative rotation between the parts as in the past. However, in the present structure, the externally lobed member is held in fixed relation to the housing, and the internally lobed member forms a rotor which travels in an orbital path about the externally lobed member. As a result, the torque transmitted will cause the rotation of the rotor at a reduced rate of speed and by connecting the rotor to a driven shaft by suitable gearing the driven shaft may be maintained in coaxial relation with the externally lobed member.

An important feature of the present invention resides in the provision of a pump of the type described including an internally lobed rotor which travels in an orbital path about a predetermined axis, and in providing an internal gear which is concentric with an axis of the rotor and which meshes with an external gear mounted on a shaft on said predetermined axis. As a result, as the rotor moves about its orbital path and rotates about its own axis, this rotation is transmitted to the external gear, acting to rotate the driven shaft. The speed at which the shaft will rotate is determined by the ratio between the number of teeth on the two gears. As the ratio between the teeth of the two gears approaches the reduction provided by the rotor, the driven shaft speed decreases, and by selection of the gear ratios the driven shaft may even be rotated in a direction opposite the direction of the rotor.

These and other objects are novelties of the present invention and will be more fully and clearly set forth in the following specification and claims.

In the drawings forming a part of the specification:

Figure 1:
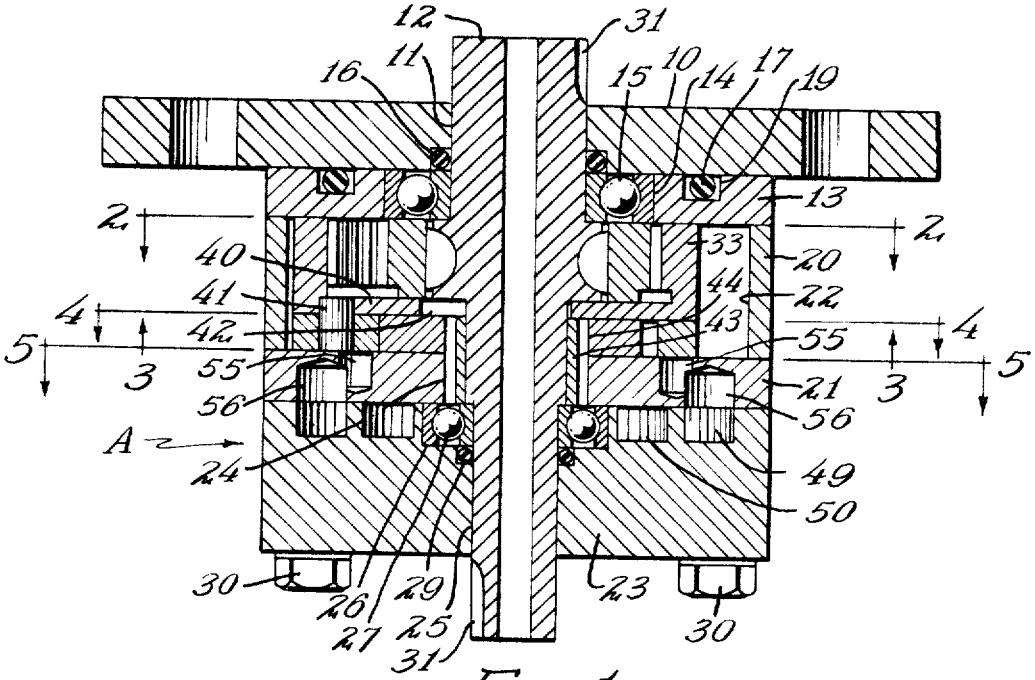
FIGURE 1 is a sectional view through the assembled apparatus.

The fluid motor is indicated in general by the letter A and is mounted upon a mounting plate 10 which is apertured as indicated at 11 to accommodate the driven shaft 12. A housing end plate 13 is secured in face contact with a surface of the mounting plate 10 and includes an axial aperture 14 which supports a ball bearing 15, the inner race of which is on the shaft 12. A sealing ring 16 is interposed between the mounting plate 10 and the shaft 12 outwardly of the bearing 15, and a sealing ring 17 is supported in a circular groove 19 on the surface of the end plate 13 which contacts the mounting plate 10 so as to form a seal between the housing and the mounting plate outwardly of the bearing 15. The groove 19 is concentric with the axis of the shaft 12.

The housing includes a housing body 20 which is secured in face contact with the end plate 13 and the opposite end plate 21. The housing body 20 includes a cylindrical inner surface or wall 22 which forms a chamber within which the rotor may rotate along its orbital path. An outer end plate 23 is secured in face contact with the end plate 21 which may be better described as a port plate. The port plate 21 includes an axial aperture 24 which is internally splined. The outer end plate 23 is provided with an axial aperture 25 through which the reduced diameter end of the shaft 12 extends. The inner surface of the end plate 23 which abuts the plate 21 is provided with a cylindrical groove 26 which encircles the aperture 25 and accommodates the bearing 27 forming a further support for the shaft 12. A sealing ring [28] *29* encircles the shaft 12 outwardly of the bearing groove 26.

The various body members described are secured in face contact by bolts 30 which extend through the outer end plate 23, the port plate 21, the housing body 20, the end plate 13; the bolt 30 being threaded into the mounting plate 10. Either or both ends of the shaft 12 may be keyed as indicated at 31 for connection with the driven member.

Figure 2:
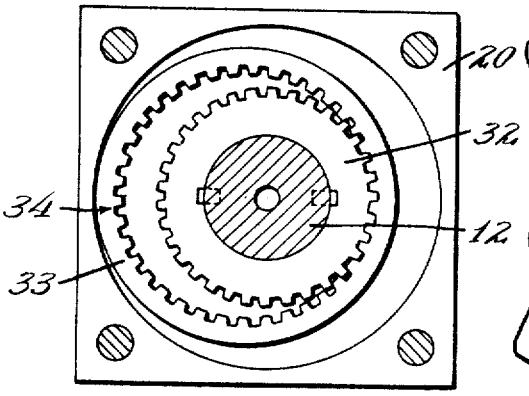
FIGURE 2 is a cross-sectional view through the apparatus, the position of the section being indicated by the line 2—2 of FIGURE 1.
Figure 3:
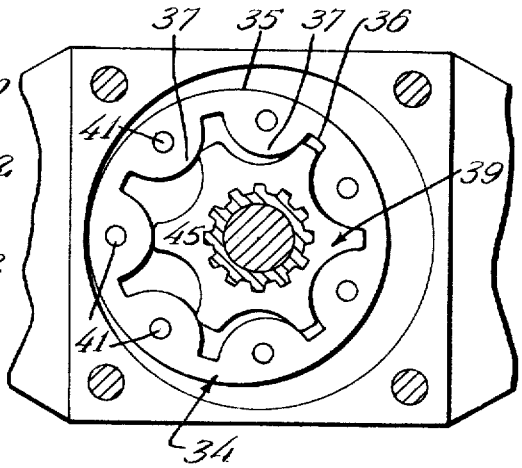
FIGURE 3 is a cross-sectional view through the apparatus, the position of the section being indicated by the line 3—3 of FIGURE 1.

As is indicated in FIGURE 2 of the drawings, a gear 32 is keyed to a shaft 12 within the housing body 20, and this external gear 32 is in constant mesh with an internal gear 33, forming a part of the rotor which is indicated in general by the numeral 34. The opposite side of the rotor 34 is shown in FIGURE 3 of the drawings. The rotor 34 is provided with a ring-shaped wall having a cylindrical outer surface 35 and a cylindrical inner surface 36 from which project a series of angularly spaced lobes 37. The lobes 37 have rounded or arcuate inner surfaces designed to accommodate the externally lobed member 39 which is contained therein. In the specific arrangement illustrated, the rotor includes seven equally spaced inwardly extending lobes 37. The gear portion of the rotor is secured to an inwardly extending ring-shaped flange 40 integral with the internal gear 33 by pins 41. The flange 40 has an axial aperture 42 therethrough which is sufficiently large in diameter to permit the passage of the shaft 12 therethrough while the rotor is traveling about its orbital path.

An externally splined sleeve 43 encircles a portion of the shaft 12 and engages with the internal splines of the aperture 24 in the port plate 21. As a result, the splined sleeve 43 is held from rotation relative to the housing. The splined sleeve 43 also engages the internal splines of the axial aperture 44 through the externally lobed member 39. This externally lobed member 39 is provided with a series of angularly spaced lobes 45 designed to fit between the lobes of the rotor 34. In the arrangement illustrated, there are six equally spaced lobes on the member 39, and the outer diameter of the lobes 39 are equal to the distance diametrically between the cylindrical wall 36 and the center of the opposite internal lobe 37.

Figure 5:
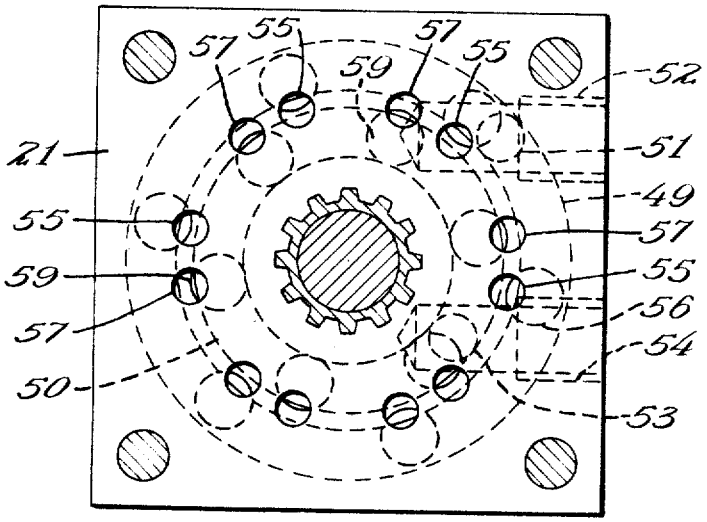
FIGURE 5 is a cross-sectional view through the apparatus, the positioning of the section being indicated by line 5—5 of FIGURE 1.

As indicated in FIGURES 1 and 5 of the drawings, the end plate 23 is provided with an outer ring-shaped groove 49 and an inner ring-shaped groove 50, both of which are concentric with the shaft 12. The grooves 49 and 50 are in the surface of the end plate 23 which abuts the port plate 21, and these grooves form input and output manifolds. Either groove may form the input/output manifolds depending upon the direction of rotation which is desired, but the outer groove 49 will be considered the input manifold for the purposes of illustration. The outer groove 49 is connected by a passage 51 parallel to the axis of rotation to the transverse port or passage 52 which is connected to a suitable source of fluid supply. The inner groove 50 is similarly connected by a passage 53 to a transverse port 54 which is connected to the return fluid line from the fluid source. As a result, fluid under pressure is transmitted to the outer ring 49, flows between the rotor and the externally lobed member 39 in a manner which will be described, and returns through the inner groove 50 and its connected passages 53 and 54.

The port plate 21 is provided with alternate passages leading to the fluid supply and the return line, these passages being centered on opposite sides of the lobes of the fixed externally lobed member 39. The passages 55 extend partially through the port plate and communicate with intersection apertures 56 communicating with the outer ring 49. This is perhaps best illustrated in FIGURE 1 of the drawing which shows the passages 55 and 56 intersecting to form communications through the port plate. Obviously, diagonally drilled passages could extend to the port plate and serve the same purpose, but the use of intersecting openings is preferred for simplicity of machining. It is necessary that the inlet and outlet passages be at approximately the same radius about the axis of the shaft 12 at the surface of the port plate which contacts the rotor.

The alternate exhaust passages 57 are drilled through the surface of the port plate 21 which engages the rotor at a radius equal to the radius of the apertures 57 with respect to the shaft axis, and these apertures 57 intersect inwardly offset apertures 59 which communicate with the inner groove 50. To summarize the description, the apertures 55 communicate with the outer ring 49 and the angularly spaced apertures 57 communicate with the inner groove 50.

Figure 4:
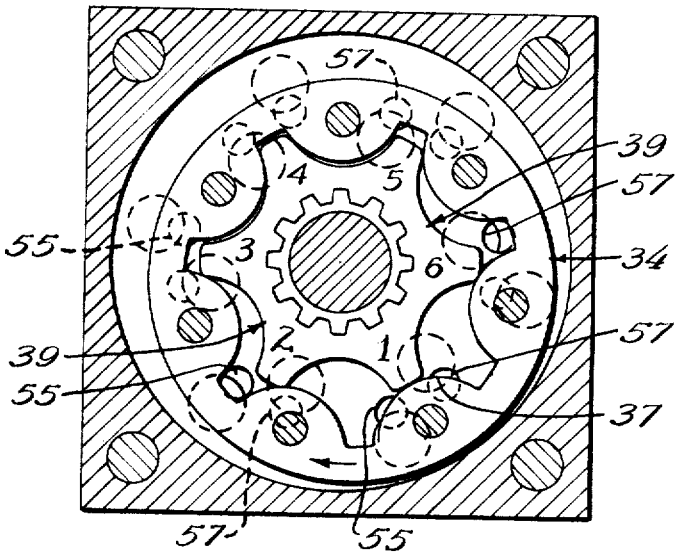
FIGURE 4 is a diagrammatic view somewhat similar to FIGURE 3 but showing the relationship between the rotor and the inlet and outlet ports.

The operation of the apparatus can perhaps be best described in reference to FIGURE 4 of the drawings. In this view, for the purpose of explanation, the individual lobes of the externally lobed member 39 have been identified by the numerals 1 to 6, inclusive. The rotor 34 and the externally lobed member 39 are so designed that opposite sides of the rotor are always sealed with respect to the member 39. In the illustration, the lobe 4 of the externally lobed member is sealed between two internal lobes of the rotor, while the opposite fixed lobe 1 is centrally located with respect to one of the internal lobes 37. Each pair of adjacent lobes is arranged to provide a chamber of varying size therebetween. In the arrangement shown in FIGURE 4, the rotor is traveling in a clockwise direction, and the chambers between lobes 1 and 2, 2 and 3, and 3 and 4 are increasing in size. The chambers between the lobes 4 and 5, 5 and 6, and 6 and 7 are decreasing in size. The chambers which are increasing in size are subject to inlet pressure through the passages 55. The chambers which are diminishing in size are all in communication with one of the outlet ports 57 so that fluid may flow from the rotor housing. The chamber formed between lobes 1 and 2 are open to inlet pressure, and will remain until the center of the wall between the internal lobes of the rotor is substantially centered with the wall between the lobes 1 and 2. Shortly thereafter this chamber will start to diminish in size, and a corresponding outlet opening 57 will be opened.

The chamber between lobes 2 and 3 are in communication with an inlet port 55, and the pressure will tend to rotate the rotor in a clockwise direction until the chamber is maximum size. Shortly before this time the inlet port will be closed, and shortly after this time the inlet port will be opened.

The small chamber between lobes 3 and 4 is starting to open communication with an inlet port 55 which also tends to rotate the rotor in a clockwise direction.

The small chamber between the lobes 4 and 5 is diminishing in size as the rotor continues rotating in a clockwise direction, and this chamber is still in communication with an outlet port 57. The chamber formed between the lobes 5 and 6 is also diminishing in size and is open to an outlet port 57. This is also true of the space between the lobes 6 and 1. As a result, fluid under pressure on one side of the rotor is causing the rotor to travel about its orbital path, and the fluid is being permitted to escape from the chambers of diminishing size on the opposite side of the rotor.

Rotation of the rotor 34 causes a gradual advancement of the gear 33 about the axis of the shaft. In other words, each time the rotor travels about its orbital path seven times, the rotor itself will complete one revolution about the shaft axis. This rotation is transmitted from the internal gear 33 to the external gear 32, and the amount of rotation transmitted to the power shaft, then depends upon the ratio between the internal and external gears. The number of cam actions of the motor compared to the speed of the output shaft may be determined by the following formula:

$$\left[\frac{Ti}{\left(\frac{Li}{Li-Le}\right)} \text{ minus } (Ti-Te)\right] \text{ times } \frac{1}{Te} \text{ equals } \frac{R}{C}$$

Where Ti is the number of teeth on the internal gear, Te the number of teeth on the external gear, Li is the number of internal lobes on the rotor, Le is the number of lobes on the externally lobed member, R is the number of rotations of the output shaft and C equals the cam actions of the rotor. If a minus number is obtained the output shaft will rotate in a direction opposite that of the rotor.

As a specific example of the construction, let it be considered that the number of teeth on the internal gear 33 is 38, the number of teeth on the external gear 32 is 33, the number of internal lobes on the rotor 34 is 7, the number of lobes on the externally lobed member 39 is 6, and the difference between the number of lobes on the rotor and the number of lobes on the externally lobed member is 1. In such a case the following formula will result:

$$\left[\frac{38}{\left(\frac{7}{1}\right)} \text{ minus } (38-33)\right] \text{ times } \frac{1}{33} \text{ equals } \frac{1}{77}$$

Thus it will be seen that there are 77 cam actions of the rotor for each rotation of the driven shaft. It should also be noted that as the difference between the number of teeth on the internal and on the external gear increases, the speed of rotation of the driven shaft will decrease to a point where it is stationary and a further difference in the number of teeth of the two gears will cause the driven shaft to rotate in a direction in reverse to the rotation of the rotor.

The power cycles of the hydraulic torque motor can be found by the following formula:

C times Le equals Power Cycles

If in the foregoing example, the number of cam actions is 77 and the number of lobes on the externally lobed member is 6, the number of power cycles will be 462. The theoretical gallons per minute employed can be determined by dividing the cubic displacement in cubic inches of each power cycle by 231, and multiplying by the number of power cycles per minute. Such a formula may be used in determining the fluid supply.

The advantages of the present construction over the hydraulic torque motors which have previously been used is believed obvious. Instead of being confined to a definite speed reduction between the rotation of a rotor about its orbital axis and a driven shaft, virtually any desired speed ratio may be obtained without employing any more movable parts. As a result, a much more versatile unit is provided at low cost and no longer is it necessary to transmit the power from a driven shaft which is rotating about an orbital path to a driven shaft.

In accordance with the patent statutes, I have described the principles of construction and operation of my improvement in hydraulic torque motors, and while I have endeavored to set forth the best embodiment thereof, I desire to have it understood that changes may be made within the scope of the following claims without departing from the spirit of my invention.

I claim:

1. A hydraulic torque motor including, a rotor housing defining a rotor chamber, a shaft supported by said housing and rotatable with respect thereto, a rotor within said housing and having a series of angular spaced internal lobes, an externally lobed member within said rotor and secured in coaxial relation to said shaft and held from rotation relative to said housing, said rotor having a greater number of lobes than said externally lobed member and in mesh therewith to travel in an orbital path about the axis of the shaft, means for closing the axial ends of the spaces between the lobes of the rotor and those of the externally lobed member, one of said closing means including angularly spaced inlet ports on one side of each lobe of said externally lobed member and outlet ports on the opposite side thereof whereby fluid pressure may enter the spaces between certain of said lobes to cause rotation of said rotor about its orbital path, and may leave the spaces between others of said lobes to permit rotation of said rotor, and means transmitting rotative movement of said rotor about the axis of said shaft to said shaft to rotate the same.

2. The structure of claim 1 and including an inlet manifold connecting said inlet ports to a source of fluid under pressure and an outlet manifold connecting said outlet ports to exhaust.

3. The structure of claim 1 and in which said rotor chamber is defined by generally cylindrical side walls and generally parallel end walls.

4. A hydraulic torque motor including, a rotor housing defining a rotor chamber, a shaft supported by said housing and rotatable with respect thereto, a rotor within said housing and having a series of angularly spaced internal lobes, an externally lobed member within said rotor and secured in coaxial relation to said shaft and held from rotation relative to said housing, said rotor having a greater number of lobes than said externally lobed member and in mesh therewith to travel in an orbital path about the axis of the shaft, said housing including an end wall in substantially sealed relation to one end of said rotor and said externally lobed member, wall forming means in substantially sealed relation with the other end of said rotor lobes and said externally lobed member, forming fluid chambers which alternately increase and decrease in size as said rotor travels about its orbital path, said housing end wall including inlet ports on one side of each external lobe and outlet ports on the other side of each external lobe, a source of fluid supply connected to said inlet ports, movement of said rotor about its orbital path exposing said fluid chambers of increasing size to said inlet ports and exposing said chambers of decreasing size to said outlet ports, an internal gear connected to said rotor and coaxial therewith, and an external gear in mesh with said internal gear and secured to said shaft coaxially therewith, whereby when said fluid causes rotation of said rotor about its axis, the rotation thereof about the shaft axis will be transmitted to said shaft through said gears.

5. The structure of claim 4 and in which said wall forming means forms a part of said rotor.

6. The structure of claim 4 and including an inlet manifold connecting said inlet ports and said source of fluid supply, and including an outlet manifold connecting said outlet ports.

7. The structure of claim 6 and in which said inlet and outlet manifolds comprise concentric ring shaped passages.

8. A hydraulic motor including, a rotor housing defining a rotor chamber, a shart rotatably supported by said housing and extending into said chamber, an externally lobed member within said chamber and secured to a wall thereof in axial alignment with said shaft, an internally lobed rotor encircling said externally lobed member and having one more lobe than said externally lobed member, the lobes of said rotor being in constantly sealed relation with the lobes of said member as said rotor moves in an orbital path about the axis of said shaft, a partition wall secured to said rotor and extending into sliding contact with said externally lobed member, said partition wall and said chamber wall forming closed chambers between said rotor and said member, an internal gear secured to said rotor and coaxial therewith, an external gear on said shaft and in constant mesh with said internal gear, whereby rotation of said rotor about its orbital path may transmit rotary movement to said shaft, said housing including a series of angularly spaced intake ports each located on one side of a corresponding external lobe of said member, and a series of outlet ports each located on the other side of a corresponding external lobe of said member, said rotor alternately opening and closing said ports upon rotation, whereby fluid under pressure may be introduced into said closed chambers to rotate said rotor, and may be allowed to flow from said closed chambers to permit such rotation.

*9. The structure of claim 1 in which the rotor chamber has at least one end wall disposed perpendicular to the axis of rotation of the shaft.*

*10. A hydraulic motor including;*

*(a) a housing having a chamber;*

*(b) a shaft rotatable in said housing and extending into said chamber;*

*(c) a first lobed member within said chamber;*

*(d) a second lobed member within said chamber and encircling said first lobed member, said first member having at least one less lobe than said second member, said lobes being disposed on said members to provide constant sealed interlobular relationship, and one of said members being stationarily secured to a wall in said chamber in axial alignment with said shaft;*

*(e) a partition wall secured to one of said members and extending into sliding contact with the other of said members, said partition wall and said chamber wall forming closed chambers intermediate said members;*

*(f) means transmitting rotative movement of the other of said members about the axis of said shaft to rotate the same; and*

*(g) means for orbitally rotating said other of said members.*

*11. The apparatus of claim 10 in which the means transmitting rotative movement of the other of said members includes; an internal gear coaxially secured to the other of said members; and an external gear on said shaft and in constant mesh with said internal gear.*

*12. The apparatus of claim 10 in which the means for rotating the other of said members relative to said one of said members includes a series of inlet and outlet ports disposed in the housing adjacent the lobes on said one of said members, said inlet and outlet ports being selectively, sequentially opened and closed by the lobes on the other of said members to control the flow of fluid into and out of the closed chambers.*

*13. In combination with a hydraulic actuator of the class wherein an output element is operable in an orbital, rotating mode about a first orbital axis and its own center axis in a fluid confining chamber; a shaft extending into said chamber and rotatably mounted substantially parallel to the orbital and center rotational axes of said output member; and means transmitting rotation of said output element to said shaft.*

*14. The apparatus of claim 13 in which the means transmitting the rotative movement of the output element is comprised of an external gear member coaxially, stationarily disposed on the shaft in intermeshing relationship with an internal gear stationarily disposed on the output element coaxially with the center axis of rotation thereof.*

*15. A hydraulic motor comprising in combination;*

*(a) a hollow housing;*

*(b) a shaft rotatably journaled thereinto;*

*(c) first and second complementary lobed members, said members having*

*(aa) parallel major surfaces, one of said members being disposed radially interiorly of the other of said members, one of said members having exterior lobes and the other of said members having interior lobes, and one of said members having at least one less lobe than the other of said members whereby relative rotation therebetween provides orbital rotary motion of one of said members and the lobed portions of said members form fluid chambers which increase and decrease in size;*

*(d) fluid sealing means slidably disposed on the major surfaces of said lobed members said sealing means extending radially of said lobed members intermediate the lobed portions thereof;*

*(e) mean transmitting rotative movement of one of said members about said shaft to rotate the same; and*

*(f) means stationarily mounting the other of said members coaxially of said shaft in said hollow housing.*

*16. The apparatus of claim 15 in which the means transmitting rotative movement of one of the lobed members includes; an external gear coaxially, stationarily mounted on said shaft; and an internal gear coaxially, stationarily mounted on said one of said members and in intermeshing relationship with said external gear.*

*17. The apparatus of claim 15 in which the means transmitting rotative movement of one of the lobed members includes; an external gear coaxially, stationarily mounted on said shaft; and an internal gear coaxially, stationarily mounted on said one of said members and in intermeshing relationship with said external gear; said internal and external gears having an unequal number of teeth.*

*18. Fluid apparatus comprising in combination;*

*(a) a hollow housing;*

*(b) a rotatable shaft extending into said housing;*

*(c) a lobed rotor means;*

*(d) a lobed member, said rotor means and said member having parallel major surfaces, one being disposed radially outwardly of the other and each having intermeshing lobed portions, one having at least one less lobe than the other, said member being stationarily disposed in said housing and said rotor means being orbitally rotatable with respect thereto;*

*(e) means for slidably, sealingly engaging the major surfaces of said member and said rotor means;*

*(f) means for causing relative rotational motion of said rotor means with respect to said member; and*

*(g) means transmitting the orbital rotational movement of said rotor to said shaft.*

*19. In combination with fluid operated apparatus of the class wherein a rotor is orbitally movable with respect to a stator, said rotor and said stator having an unequal number of intermeshing, lobed portions and said apparatus includes a shaft rotatably journaled independently of said rotor and stator; an internally toothed gear member stationarily disposed on said rotor and an externally toothed gear member stationarily disposed on said shaft member, said gear members being in intermeshing driving disposition.*

*20. In combination with fluid operated apparatus of the class wherein a rotor is orbitally movable with respect to a stator, said rotor and said stator having an unequal number of intermeshing, lobed portions and said apparatus includes a shaft rotatably journaled independently of said rotor and stator; an internally toothed gear member stationarily disposed on said rotor and an externally toothed gear member stationarily disposed on said shaft member, said gear members being in intermeshing driving disposition and having an unequal number of teeth.*

*21. In combination with fluid operated apparatus of the class wherein a rotor is orbitally movable with respect*

*to a stator, said rotor and said stator having an unequal number of intermeshing lobed portions and said apparatus includes a shaft rotatably journaled therein independently of said rotor and stator, a driving member stationarily, coaxially, disposed on said rotor and a driven member stationarily, coaxially disposed on said shaft member.*

*22. A hydraulic motor including*

*(a) a housing having a chamber,*

*(b) a shaft rotatable in said housing and extending into said chamber,*

*(c) a lobed member in the chamber,*

*(d) a further lobed member in the chamber encircling the inner member for movement in an eccentric orbital path thereabout,*

*(e) said members having inner and outer lobes that orbitally constantly intermesh at one side of the axis of the aforesaid rotation while leaving fluid pockets at the opposite side of the axis,*

*(f) means for preventing rotation of one of said lobed members relative to the housing and allowing orbital rotating motion of the other of said lobed members relative to the housing,*

*(g) means providing passage for fluid into and out of said pockets, and*

*(h) means transmitting rotation of the other of said members to said shaft.*

References Cited

The following references, cited by the Examiner, are of record in the patented file of this patent or the original patent.

UNITED STATES PATENTS

| | | | |
|---|---|---|---|
| 946,253 | 1/1910 | Moore. | |
| 1,250,243 | 3/1918 | Moore | 74—804 |
| 2,863,336 | 12/1958 | Parstorfer | 74—804 |
| 2,989,951 | 6/1961 | Charlson | 91—68 |
| 3,098,400 | 7/1963 | Hedges | 74—804 |
| 2,871,831 | 2/1959 | Patin | 91—56 X |
| 2,947,290 | 8/1960 | Froede | 91—56 X |
| 3,139,835 | 7/1964 | Wilkinson | 103—130 X |
| 3,148,667 | 9/1964 | Peras | 230—145 X |
| 3,215,043 | 11/1965 | Huber | 91—56 |
| 3,288,078 | 11/1966 | Monroe | 103—130 |

FOREIGN PATENTS

| | | |
|---|---|---|
| 24,559 | 1908 | Great Britain. |

MARTIN P. SCHWADRON, *Primary Examiner.*

G. N. BAUM, *Assistant Examiner.*

UNITED STATES PATENT OFFICE

CERTIFICATE OF CORRECTION

Reissue No. 26,383 April 23, 1968

Mortimer J. Huber

It is certified that error appears in the above identified patent and that said Letters Patent are hereby corrected as shown below:

In the heading to the printed specification, line 5, "Wisconsin" should read -- Minnesota --.

Signed and sealed this 5th day of May 1970.

(SEAL)
Attest:

Edward M. Fletcher, Jr.
Attesting Officer

WILLIAM E. SCHUYLER, JR.
Commissioner of Patents